US007413552B2

(12) United States Patent
Vago

(10) Patent No.: US 7,413,552 B2
(45) Date of Patent: Aug. 19, 2008

(54) METHOD FOR SUBAQUEOUS ULTRASONIC CATASTROPHIC IRRADIATION OF LIVING TISSUE

(76) Inventor: Robert Vago, 1196 Mallard Marsh Dr., Osprey, FL (US) 34229

( * ) Notice: Subject to any disclaimer, the term of this patent is extended or adjusted under 35 U.S.C. 154(b) by 178 days.

(21) Appl. No.: 10/912,608

(22) Filed: Aug. 5, 2004

(65) Prior Publication Data
US 2007/0167880 A1   Jul. 19, 2007

(51) Int. Cl.
*A61N 7/00*   (2006.01)
(52) U.S. Cl. ........................ 601/2; 600/407; 600/437; 601/3; 601/4
(58) Field of Classification Search ............ 601/2–4; 600/407, 437
See application file for complete search history.

(56) References Cited

U.S. PATENT DOCUMENTS

| RE31,779 E | * | 12/1984 | Alliger | 252/187.23 |
|---|---|---|---|---|
| 4,942,868 A | | 7/1990 | Vago | |
| 5,048,520 A | | 9/1991 | Vago | |
| 5,178,134 A | | 1/1993 | Vago | |
| 5,305,737 A | * | 4/1994 | Vago | 601/4 |
| 5,523,058 A | * | 6/1996 | Umemura et al. | 422/128 |
| 5,665,141 A | * | 9/1997 | Vago | 95/30 |
| 5,694,936 A | | 12/1997 | Fujimoto et al. | |
| 6,036,644 A | * | 3/2000 | Schutt | 600/458 |
| 6,206,843 B1 | | 3/2001 | Iger et al. | |
| 6,382,134 B1 | | 5/2002 | Gruenberg et al. | |
| 6,395,096 B1 | | 5/2002 | Madanshetty | |
| 6,476,622 B1 | * | 11/2002 | Robinson, Jr. | 324/692 |
| 6,719,449 B1 | | 4/2004 | Laugharn, Jr. et al. | |
| 2004/0049134 A1 | | 3/2004 | Tosaya et al. | |
| 2005/0017599 A1 | | 1/2005 | Puskas | |
| 2005/0038361 A1 | * | 2/2005 | Zhong et al. | 601/4 |
| 2005/0075587 A1 | | 4/2005 | Vago | |
| 2005/0143638 A1 | * | 6/2005 | Johnson et al. | 600/407 |
| 2006/0009693 A1 | * | 1/2006 | Hanover et al. | 600/407 |
| 2006/0009696 A1 | * | 1/2006 | Hanover et al. | 600/437 |
| 2006/0021642 A1 | * | 2/2006 | Sliwa et al. | 134/184 |
| 2006/0158956 A1 | * | 7/2006 | Laugharn et al. | 366/127 |
| 2007/0032828 A1 | | 2/2007 | Vago | |
| 2007/0167983 A1 | | 7/2007 | Vago | |

FOREIGN PATENT DOCUMENTS

WO   WO 2006/017561   2/2006

OTHER PUBLICATIONS

Lymbery, Philip; "The Welfare of Farmed Fish"; May 1992; pp. 1-27.
Graff, K.F.; "A History of Ultrasonics"; Chapter 1 of "Physical Acoustics"; 1981.

(Continued)

*Primary Examiner*—Brian L. Casler
*Assistant Examiner*—Baisakhi Roy

(57) ABSTRACT

A fish killing and fish tissue sanitizing apparatus includes a tank, a water feed pipe extending to the tank, and an electromechanical transducer in pressure-wave transmitting relationship to the tank for generating ultrasonic pressure waves in water contained in the tank. An electrical signal generator is operatively connected to the transducer for energizing same with an alternating electrical signal. A sensor is in operative contact with water contained in the tank for detecting transient and inertial cavitation occurring within the water in the tank.

6 Claims, 8 Drawing Sheets

OTHER PUBLICATIONS

National Academy Press; "Long Range Options: Advanced Methods for Handling Liquid Waste"; 1996; pp. 1-8.

"Bonneville Power Administration FY 2001 Innovative Project Proposal Review"; 2001.

Stone, Dana; "Dealing With a Toxic Threat"; The Ohio State University College of Engineering; Dec. 1999, pp. 1-3.

Vagle, Steven; "On the Impact of Underwater Pile-Driving Noise on Marine Life"; Feb. 2003, pp. 1-41.

Kenneth S. Suslick "The Chemical and Physical Effects of Ultrasound"; Summary of Sonochemistry and Sonoluminescence, Research Group Chemistry; pp. 1-10; 2006.

USPTO Search ABST/(Ammonia and Nitrification); pp. 1-2.

70 pages of Google Search (Ammonia and Nitrification).

G. Scherba et al. "Quantitative Assessment of the Germicidal Efficacy of Ultrasonic Energy"; Department of Veterinary Pathobiology; Department of Electrical and Computer Engineering, University of Illinois; Applied and Environmental Microbiology; Jul. 1991; 1991-American Society for Microbiology pp. 2079-2084.

William D. O'Brien, Jr., Ph.D, et al. "Mouse Lung Damage From Exposure to 30 kHz Ultrasound"; Ultrasound in Medicine and Biology, 1994; pp. 1-24.

William D. O'Brien, Jr., et al. "Comparison of Mouse and Rabbit Lung Damage Exposure to 30kHz Ultrasound"; Ultrasound in Medicine and Biology, 1994; vol. 2, No. 3, pp. 299-307.

William D. O'Brien, Jr., et al. "Rabbit and Pig Lung Damage Comparison From Exposure to Continuous Wave 30 kHz Ultrasound"; Ultrasound in Medicine and Biology, 1996; vol. 22, No. 3; pp. 345-353.

Graph, Watts/cm2 vs. Frequency—mHz; Graph Modified From Esche, 1952.

O.I. Babikov; "Cavitation Energy vs. Viscosity", Ultrasonics And Its Industrial Application; Translated from the Russian Consultants Bureau; 1960.

H. Schöne et al.; "Quality Control of Disinfection in Ultrasonic Baths"; TU Hamburg-Harburg Reports on Sanitary Engineering 35; 2002; Ultrasound in Environmental Engineering II, pp. 1-8.

Brennen, Christopher-Earls; Quality Control of Disinfection in Ultrasonic Baths; 1995, Oxford University Press; Chapters 1-4.

Scientific American; Feb. 1989; p. 84.

Louis A. Helfrich et al. Fish Farming in Recirculating Aquaculture Systems (RAS); Department of Fisheries and Wildlife Sciences; Virginia Tech; pp. 1-15.

Dr. Ying Q. Ji et al., "Evaluation of Recirculating Aquaculture Systems"; Minnesota Department of Agriculture and the University of Minnesota; Oct. 1997; pp. 1-33.

International Search Report issued in a corresponding PCT application, dated Nov. 14, 2005.

International Search Report issued in a corresponding PCT application, dated Aug. 15, 2006.

* cited by examiner

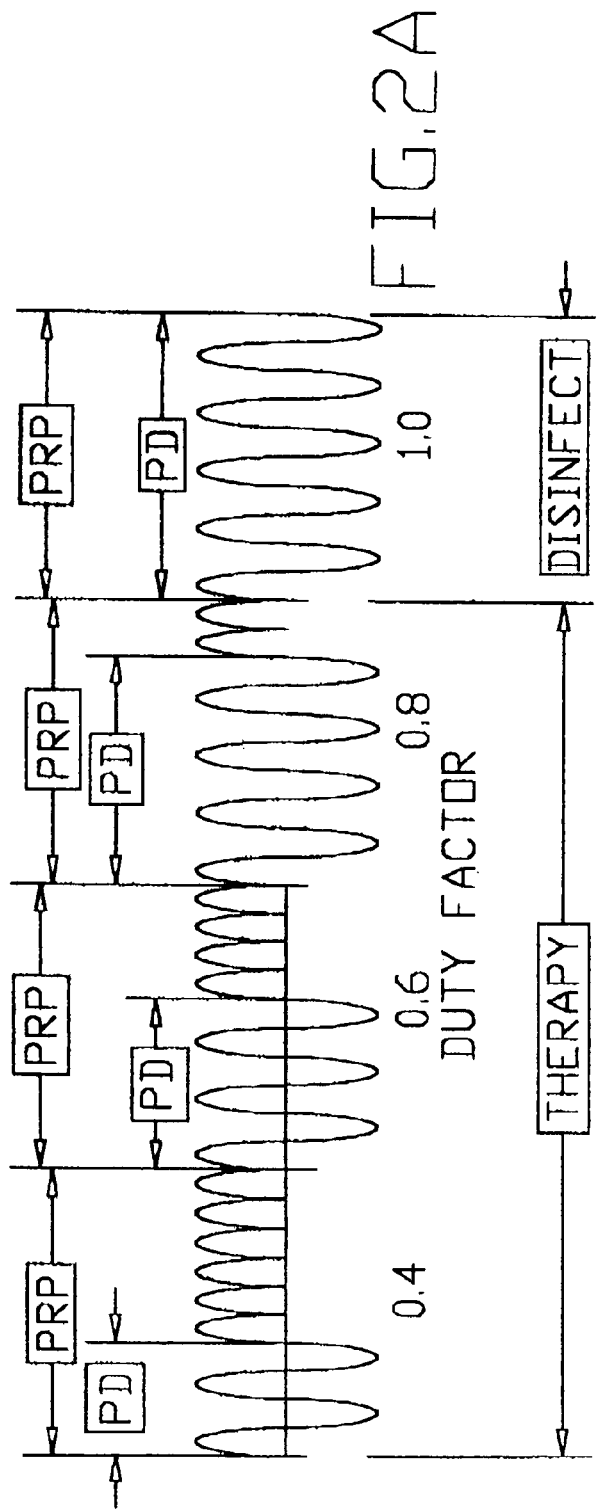
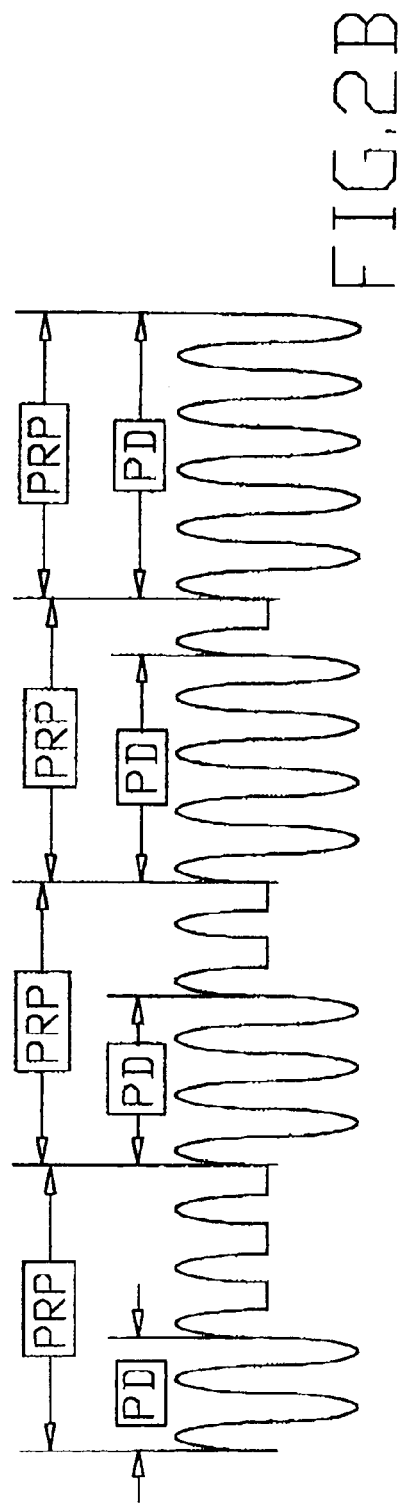

US 7,413,552 B2

METHOD FOR SUBAQUEOUS ULTRASONIC CATASTROPHIC IRRADIATION OF LIVING TISSUE

FIELD OF THE INVENTION

This invention relates generally to a method and an associated device or apparatus for treating living tissue with ultrasonic wave energy. More specifically, this invention relates to a method and to an associated device or apparatus for catastrophic low-frequency, medium intensity ultrasonic irradiation of living fish tissue disposed in submicron filtered/degassed water. More particularly, this invention relates to a method and an associated apparatus for achieving instantaneous unconsciousness and insensibility of fish while concomitantly sanitizing its tissue until death supervenes

BACKGROUND OF THE INVENTION

With specific reference to fish-farms, existing regulatory authorities recommend no specific method for slaughtering fish and as a result, some or all of the following techniques may be employed:

1) Asphyxiation—suffocating the fish by removal from water. Farmed trout are commonly "harvested" by removal from water into bins in which they suffocate. Fish farmers have started to put live fish into bins containing ice according to Bristol University's Department of Meat Animal Science. The researchers also found when fish were removed from water they can often still feel what is happening to them for almost 15 minutes at low temperatures. The researchers concluded that the practice of suffocating fish on ice could unnecessarily prolong the time to unconsciousness. (Kestin, Wotten & Gregory, 1991.)

2) Bleeding—cutting the fish gills causing death by blood loss. This method may be preceded by stunning the fish in a tank containing carbon-dioxide saturated water. Welfare concerns arise with this stunning method as the "fish try to escape violently" when put into the tank, (Kestin, Apr. 2, 1992). The fish are usually unable to move within one minute and do not lose sensibility for 4-5-minutes. Fish could therefore have their gills cut whilst still conscious if lack of movement was mistaken for unconsciousness. If gill-slitting was carried out unsatisfactorily, it is possible that fish could recover consciousness whilst bleeding. For salmon, bleeding is recommended if the fish are intended to be smoked. This ensures the blood vessels are not readily apparent in the finished product. (Shepherd & Bromage, 1988.)

Norwegian fish farmers slaughter salmon by cutting the main blood vessels located in the head. The fish are then returned to the water where they subsequently weaken and die from blood loss. (Sedgewick, 1988.)

3) Concussion—killing by a blow to the head with a small, hand-held club. This slaughter method can cause instantaneous unconsciousness in the fish if done properly. However, the potential for improper stunning and injury to the fish is considerable. (Kestin, Apr. 2, 1992.)

4) Electrocution—killing by placing fish in a large tank through which electricity is allowed to flow for a few seconds. The electrical current and its frequency has to be at just the right level to stun the fish without burning the tissue. In early trials the system used too much electricity and stunned too few fish to be commercially practical. (Anthony Browne, The Times, May 3, 2003)

The Bristol University research team concluded that currently practiced slaughter methods for farmed fish fall far short of the requirement for instantaneous unconsciousness. Concussion and electrocution methods have been suggested as having the most potential for achieving instantaneous unconsciousness in fish, (Kestin, Wotten & Gregory, 1991).

Currently, following their slaughter, fish are cleaned externally then prepared for market. In its slaughtered state, fish tissue will contain whatever toxic pollutants, parasites, bacterial and viral pathogens it is contaminated with.

It is widely recognized that intensive and stressful conditions, associated with fish farming, can predispose fish to attack from disease and parasitic infection and where diseases such as bacterial septicaemia and gill infections, and bacterial gill disease prevail.

Bacterial diseases are currently treated by the use of antibiotics mixed in with fish feed. Potential human health hazards can arise from the high incidence of farmed-fish disease and its subsequent treatment. Prolonged use of antibiotics in fish can lead to the development of drug-resistant strains of bacteria. It is feared that such drug resistance could then be transferred from fish bacteria to human bacteria in the digestive tract with potentially disastrous results. Many antibiotics that treat fish diseases, such as tetracycline and chloramphenicol, are also used in human medicine. (Shepherd & Bromage, 1998.)

Drug resistance may be unknowingly picked up by a human via the above route. If that person were to fall ill and be treated by a doctor using similar antibiotic, the drug may have been rendered less efficient or ineffective.

Another example, with regard to toxic PCB infestation, farmed salmon are fed from a global supply of fish-meal and fish-oil from small open sea fish which studies show are the source of PCB's (Polychlorinated Biphenyls) in most farmed salmon. In three independent studies scientists tested 37 fish-meal samples from six countries and found PCB contamination in nearly every sample. (Jacobs 2002, Easton 2002, and CIFA 1999.)

Humans can ingest PCB's from eating contaminated fish and there is broad multiple governmental agreement from multiple governmental agencies that consumption of PCB's are expected to cause cancer and alter brain development in humans.

OBJECTS OF THE INVENTION

A general object of the present invention is to provide an improved method for killing fish.

A related general object of the present invention is to provide an improved method for killing fish and sanitizing the fish tissue.

More specifically, it is an object of the present invention to provide a method for inducing instantaneous fish unconsciousness and concomitantly sanitizing fish tissue.

An even more specific object of the present invention is to provide a method wherein ultrasonic irradiation is generated that has sufficient acoustic pressure to effect instantaneous unconsciousness in fish thereby maintaining insensibility of the fish to pain until death supervenes.

A parallel object of the present invention is to provide such a method that also effect a rapid safe transformation of toxic pollutants, such as DDTs, polychlorinated biphenyls (PCB's) and killing of pathogenic bacteria, viruses and parasites that reside in slaughtered fish tissue.

These and other objects of the present invention will be apparent from the drawings and descriptions herein. Although every object of the invention is attained in at least one embodiment of the invention, there is not necessarily any single embodiment of the invention in which all objects are attained.

SUMMARY OF THE INVENTION

An ultrasonic sound pressure level of 32 Pa is not harmful to fish while a pressure level of 1,000 Pa is harmful to many fish, (Hastings, 1990) and an ultrasonic pressure of 266,000 Pa is fatal to most fish. (Norris & Mohl, 1983.)

Pressure sensitivity varies with fish-species and to avoid "overkill" during the "slaughtering phase", the lowest ultrasonic pressure necessary to effect a particular species' instantaneous unconsciousness and continuing insensibility until death supervenes must be determined experimentally by applying a subaqeuous low frequency, adjustable peak amplitude ultrasonic pressure wave having equal compressional and rarefactional cycles in the approximate pressure range 75 Pa to 300 kPa.

For each particular fish species to experience immediate, predictable massive, irreparable internal organ and vascular damage, this invention utilizes submicron filtered degassed tap water whose properties permit propagation of a sinusoidal ultrasonic pressure wave without significant amplitude attenuation throughout the water mass contained by the fish-holding tank. While the slaughtering peak pressure amplitude selected for each particular fish species is being applied, the following concomitant fish-tissue sanitization process ensues.

All fish exhibit a high-water tissue content. For example, Atlantic Salmon comprises 32% dry matter and 68% water. Tank water of different salinity, temperature and pressure holds differing amounts of oxygen, nitrogen and other gases called air. Given time, the gas pressure in the tank will equalize and become the same pressure as the air over it. Subsequently the gas pressure in fish tissue and bloodstream will become the same as in the water. The air pressure is the sum of the partial pressures of the individual gases, (primarily nitrogen, 78% and oxygen, 21%) that constitute air.

Oxygen moderately above saturation in water is not typically a problem because fish use oxygen to breathe. However, since nitrogen is the most common of the inert gases in fresh or salt water systems and is not metabolized by fish it is the gas most commonly associated with bubble formation in fish. Nitrogen is an inert gas normally stored throughout fish tissues and fluids in a physical solution. When a fish is exposed to decreased hydrostatic and/or barometric pressures, the nitrogen gas dissolved in the fish tissues and fluids becomes supersaturated and comes out of solution. If the nitrogen is forced to leave the solution too rapidly, bubbles form in different parts of the fish, causing a variety of signs and symptoms.

Fish sense high gas pressures. Like a diver, fish will go deeper in the tank to compress the gases and thereby prevent nitrogen bubble formation in their blood and tissue. Nitrogen enters a fish through its gills, just like oxygen. It is then carried to the tissue by the blood. Once distributed, nitrogen remains in the tissue while oxygen is consumed.

When low frequency medium intensity ultrasonic pressure waves are propagated through fish undergoing slaughter, the negative pressure wave will cause the nitrogen in the fish tissue and blood to leave solution very rapidly, forming bubbles which under the influence of the alternating negative and positive pressure portions of the low frequency medium intensity ultrasound will culminate in transient cavitation bubble imploding events.

The associated chemical effects of ultrasound transient cavitation implosions are explained in terms of reactions occurring inside, at the interface, or at some distance away from the cavitating bubbles. In the interior of an imploding cavitation bubble, extreme but transient conditions are known to exist. Temperatures approaching 5,000K have been estimated, and pressures of several hundred atmospheres have been calculated.

Temperatures of the order of 2,000K have been estimated for the interfacial region surrounding an imploding bubble based on observed reactivity. During bubble implosion, which occurs within 100 nsec, $H_2O$ undergoes thermal dissociation to yield hydroxyl radicals and hydrogen atoms. Sonochemical reactions are characterized by the simultaneous occurrence of supercritical water reactions, direct pyrolyses, and radical reactions, especially with solute concentrations.

The sonochemical degradation of a variety of chemical contaminants in aqueous solution has been previously reported. (Kotrounarou et al., 1991, 1992a,b.) Substrates such as chlorinated hydrocarbons, (PCB s & DDT s), pesticides, phenols and esters are transformed into short-chain organic acids, CO2 and inorganic ions as the final products. Ultrasonic transient cavitation appears to be an effective method for destruction of organic contaminants in water because of localized high concentrations of oxidizing species such as hydroxyl radicals and hydrogen peroxide in solution, high localized temperatures and pressures and the formation of transient supercritical water. (Hua et al. 1995.)

With a non-submicron filtered, non-degassed water mass surrounding a fish exterior, the water's occluded micron-sized and larger particles may contain sufficient trapped gas to evolve into transient cavitation prone bubbles when irradiated with low frequency medium intensity ultrasound.

To ensure consistent and repeatable fish slaughtering/sanitization settings, the water medium through which the low frequency ultrasonic pressure wave is propagated must remain sufficiently filtrated and degassed during subsequent fish slaughtering/sanitization processes. Precautionary sensing for the presence of transient cavitation bubbles in the water surrounding the fish is detected by the inventions microphone PZT transducers, (previously referred to in patent application Ser. No. 10/676,061), which provide a microcomputer with the signal necessary for it to shut down ultrasonic transmission until the necessary degassification and particulate size reduction exchange in the tank has been effected.

These precautions are necessary because transient bubble cavitation occurring in close proximity to the fish exterior will bombard its flesh with imploding high velocity bubble jets possibly causing an unsightly outward appearance of the affected fish making it an undesirable product for market.

Also, millions of transitioning vibrating bubbles in the water surrounding the fish provide a protective bubble-screen around the fish exterior which serves to attenuate the amplitude of the external pressure wave entering the fish by approximately 33 dB (greater than 1 micropascal). Such external ultrasonic pressure wave amplitude attenuation will stop transient bubble cavitation formation within the fish thereby preventing its sanitization, and will sustain consciousness and continuing sensibility to pain and suffering resulting from its exterior flesh being subjected to the forces and temperatures associated with transient bubble cavitation implosion events.

An economic water supply origin for the above slaughtering/sanitization process is from a municipal supply source which is subsequently passed through an activated charcoal filter to remove its chlorine content and then through a submicron reverse osmosis filter to remove all larger particulate matter.

The submicron filtered water output from the reverse osmosis device is pumped into an injector nozzle whose discharge is fed via a custom-designed combined right-angled elbow and on/off discharge faucet. The low pressure zone on the exit side of the internally Venturi-shaped nozzle serves to remove gas from the reverse osmosis processed water which is discharged to atmosphere as it leaves the faucet and before the water enters the fish-holding tank.

After several slaughtering/sanitization processes and fish removals have been completed, either the detection of transient cavitation or presence of shed fish scales will require the fish-holding tank containing reverse osmosis filtered and degassed water to be drained and then refilled with untreated municipal tap water and irradiated with low frequency, medium intensity subaqueous applied ultrasound for the time-period necessary to fully sanitize the tank.

Accordingly, a fish killing and fish tissue sanitizing apparatus comprises, pursuant to the present invention, a tank, a water feed pipe extending to the tank, an electromechanical transducer in pressure-wave transmitting relationship to the tank for generating ultrasonic pressure waves in water contained in the tank, an electrical signal generator operatively connected to the transducer for energizing same with an alternating electrical signal, and a sensor in operative contact with water contained in the tank for detecting transient and inertial cavitation occurring within the water in the tank.

Pursuant to further features of the present invention, the apparatus further comprises an injector disposed along the feed pipe proximate to a barrier thereof, the injector preferably taking the form of a Venturi injector, the feed pipe being coupled to a disinfectant reservoir and a valve being provided for introducing a disinfectant into a water stream flowing along the feed pipe, and the barrier being a wall of the pipe, the pipe having at least one elbow-type bend.

Pursuant to another feature of the present invention, the sensor is a PZT probe.

According to another feature of the present invention, the apparatus further comprising means operatively coupled to the signal generator for sweeping a frequency of an electrical excitation signal produced by the signal generator.

A microprocessor may be operatively connected to the sensor, a display being operatively connected to the microprocessor for communicating to an operator a status of cavitation in the tank.

The apparatus defined in claim 1 wherein the tank is one of two tanks communicating with one another via a barrier.

An ultrasonic treatment method comprises, in accordance with the present invention, feeding water to a tank, disposing a living organism in the water, and thereafter generating ultrasonic pressure wave vibrations in the water of a frequency range and an intensity and duration to kill the living organism and to sanitize organic tissues of the organism.

Preferably, the water fed to the tank is substantially free of dissolved gases and particulate matter. Accordingly, pursuant to an additional feature of the present invention, the method further comprises filtering and degassing the water prior to the feeding of the water to the tank. The degassing of the water may include accelerating the water flow to create micro-sized gas bubbles and bursting the bubbles. The accelerating of the water flow may more particularly include directing the water through a Venturi injector. The bursting of the bubbles may more particularly include impacting the water against a barrier.

The method preferably also comprises automatically monitoring the water in the tank to detect inertial or transient cavitation. The status of inertial of transient cavitation in the water in the tank may be displayed for inspection by an operator. The generating of the ultrasonic pressure wave vibrations is terminated in the event that cavitation is detected occurring within the water in the tank. This termination may be automatic or initiated by an operator in response to the display alert as to the existence of cavitation in the tank water.

The generating of ultrasonic pressure wave vibrations may include sweeping a frequency of the ultrasonic pressure wave vibrations.

Pursuant to additional features of the present invention, the further comprises removing the killed organism from the tank, thereafter delivering disinfectant and water to the tank, and thereafter inducing ultrasonic cavitation in the water and disinfectant in the tank. The inducing of the ultrasonic transient cavitation may include generating full-wave compression and rarefaction cycles at an ultrasonic frequency in the water and disinfectant in the tank. The inducing of the ultrasonic transient cavitation may further include sweeping the frequency.

BRIEF DESCRIPTION OF THE DRAWINGS

FIG. 2A is a graph of a pulsed waveform used for iterative stable cavitation control in a method and apparatus for treating fish with ultrasonic pressure wave energy, showing a fully rectified wave portion.

FIG. 2B is a graph of another pulsed waveform used for iterative stable cavitation control in a method and apparatus for treating fish with ultrasonic pressure wave energy, showing a half-wave rectified wave portion.

DETAILED DESCRIPTION OF THE PREFERRED EMBODIMENTS

Figure 8A:
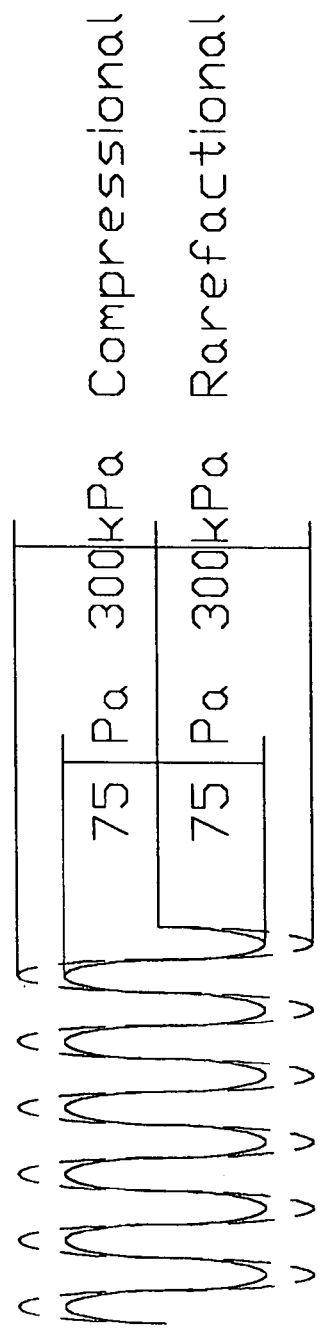
FIG. 8A is a graph of a continuous peak amplitude adjustable ultrasonic waveform which, when used in conjunction with submicron filtered and degassed water, will apply repeatable subaqeuous ultrasonic compressional and rarefactional pressures sufficient in amplitude to render fish instantaneously unconscious, to continue fish insensibility and concomitantly sanitize fish tissue until death supervenes.
Figure 8B:
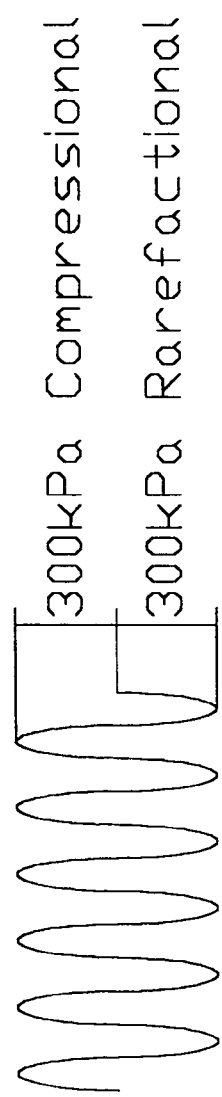
FIG. 8B is a graph of a continuous ultrasonic waveform which when used in conjunction with municipal tap water will, following fish slaughtering and sanitization, effect fish tank decontamination.
Figure 9:
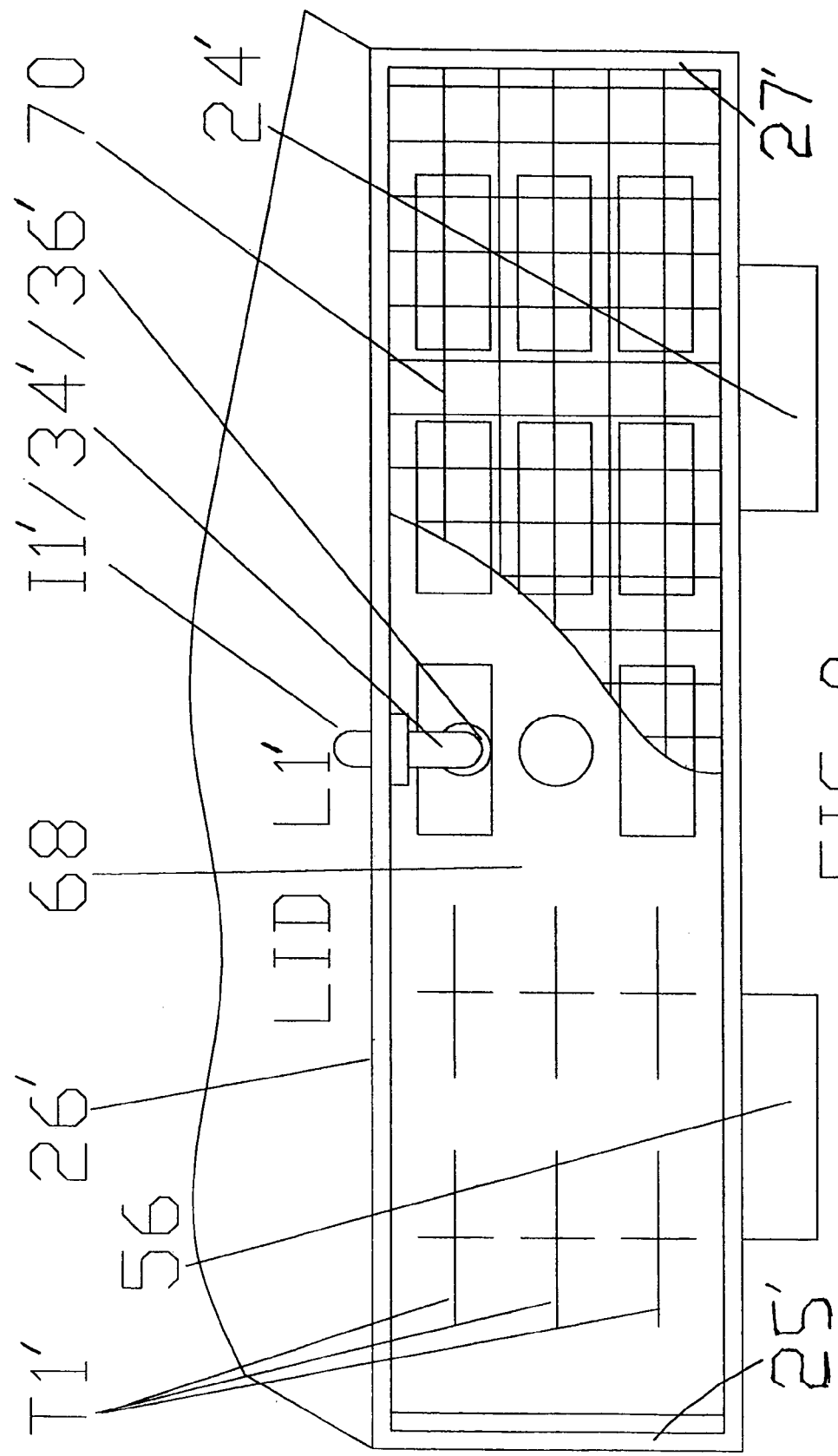
FIG. 9 is a plan view of a portion of the two-tank fish farm of FIG. 3, configured to be a stand-alone device or apparatus for fish slaughtering and tissue sanitization in accordance with the present invention.

FIGS. 1-6 illustrate an apparatus for treating fish with ultrasonic pressure waves for wound treatment purposes. The apparatus of FIGS. 1-6 may incorporate a fish killing and sanitizing functionality described hereinafter with reference principally to FIGS. 7-9.

The following operational description of a wound treatment apparatus applies to human and animal configurations of the apparatus. A configuration of the apparatus for the treatment of fish need not include provision for handling disinfectant in a therapy tank but will include all other operational features plus some additional features necessary to address the needs of fish farming.

Figure 1:
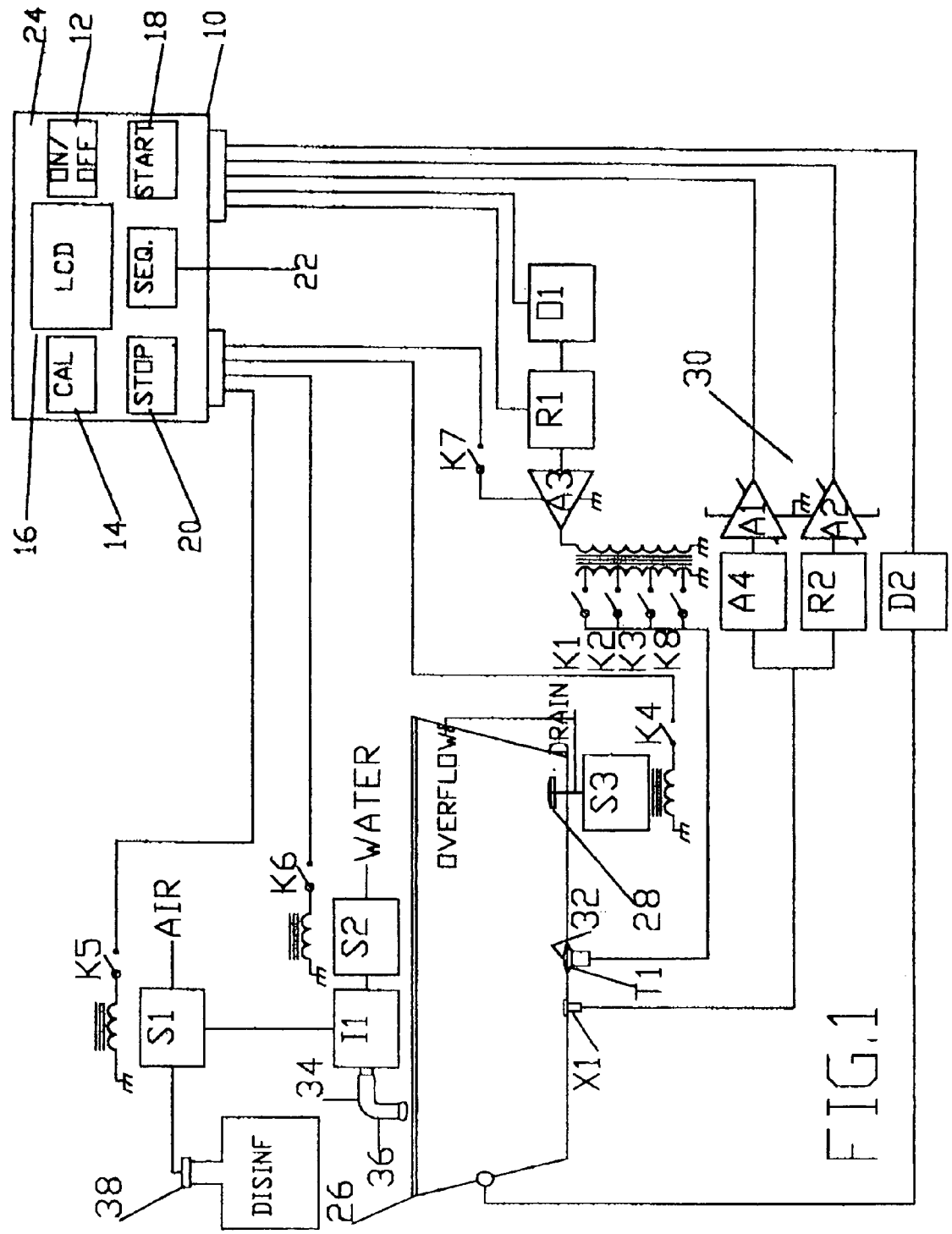
FIG. 1 is an overall system block diagram outlining functional interrelationships among three major elements of a human and land-animal debridement and wound-therapy supine treatment apparatus, which may incorporate a device for killing fish and sanitizing fish tissue in accordance with the present invention.

FIG. 1 illustrates a control microcomputer or microprocessor 24 by which means an operator can cause the three processes associated with open-wound ultrasonic therapy to function, as needed. Microcomputer 24 has a control panel (not separately designated) includes an illuminated touchpad 12 for activating the wound treatment apparatus. Another illuminated touchpad 14 initiates a "one time" on-site calibration cycle. A liquid crystal display (LCD) 16 displays all relevant information and operator instructions. A further touchpad 18 is used to initiate a "start selected sequence" routine. Yet another touchpad 20 initiates a "stop selected sequence" routine. A sequencer touchpad 22 is accessed by microcomputer or microprocessor 24 to assist the operator in initiating the required operation.

The wound treatment apparatus described herein operates in either a manual or an automatic operational mode and either mode is selectable at the operator's choice.

Sequencer touchpad 22 runs the LCD 16 through a menu so the operator can make selections as required. The menu is set forth in the normal sequence of operation, i.e., therapy tank fill, wound debridement/cleaning, wound healing, decontamination/auto therapy tank drain, therapy tank drain, fish conditioning and fish excrement removal. Each of these operations, other than therapy tank fill, may be taken in the operator preferred order, e.g., if for humans and animals the operator wanted to disinfect the therapy tank before wound therapy, this is possible but the microcomputer 24 will instruct the operator not to install the patient and will empty the therapy tank at the completion of the automatic decontamination cycle time.

Before the wound treatment apparatus can be used for routine therapy treatment it must first be calibrated onsite. When a therapy tank 26 (FIG. 1) is filled the first time, the operator activates the system by depressing the illuminated "ON" touchpad 12. This activates all electronic circuits but stops ultrasound transmission to the therapy tank 26 by opening a switch K7 to disable an amplifier A3. The operator, by means of the sequencer touchpad 22 and LCD 16 selects from the menu option "THERAPY TANK FILL." Microcomputer 24 then asks the operator via LCD 16 to select "AUTO, (FILL)." After making the required selections the operator is instructed by microcomputer 24 via LCD 16 to depress the "START" touchpad 18. Microcomputer 24 closes a switch K4, which energizes a solenoid S3 and closes a drain 28. Then a switch K6 is closed, which energizes a solenoid S2 and commences aerated tub fill. The therapy tank fill components are turned off when a preset level is reached as determined by a sensor D2.

Calibration

Until microcomputer 24 has conducted its first on-site calibration, it will only respond to an instruction to fill the therapy tank 26. Microcomputer 24 will tell the operator via LCD 16 why and ask the operator to depress calibration (CAL) touchpad 14. The calibration cycle is fully automatic and operates as follows.

An initial step in an iterative control technique is to test the number of full sinusoidal cycles of equal amplitude ultrasonic compressional and rarefactional pressure waves needed to stimulate inertial or transient cavitation in water. This is accomplished by running ten discrete sets of tests of which the longest and the shortest number of cycles are discarded and the average number of cycles is calculated from the remaining eight tests.

This average number of cycles is the pulse repetition period, i.e., the time from the beginning of one pulse to the beginning of the next. There is no ultrasound "off" time in this pulse repetition period since it is made up of two different pulse types, one immediately following the other. The pulse duration (PD) is the length of time required for the first type pulse to occur and is equal to the period times the number of sinusoidal cycles in the pulse. The duty factor is the fraction of time that the first type pulse is on and consists of full sinusoidal compressional and rarefaction pressure waves. The balance of the pulse repetition period is occupied by the second pulse type, which consists of half sinusoidal (rectified) compressional pressure waves The iterative stable cavitation control technique consists essentially of decreasing the above-defined duty factor from 0.8 in increments of 0.1, for example, until the setting is reached where it takes transient cavitation 15 minutes or more to manifest itself, whereupon, the duty factor is reduced, for example, by an increment of 0.1 to provide a safety margin.

The above iterative control technique is conducted with the average time to transient cavitation calculated from the above ten discrete sets of tests corresponding to the duty factor 1.0 and using the precision microcomputer clock as the determinant for setting the trial duty factors where it takes transient cavitation 15 minutes or more and whose value and increments are adjusted from tank to tank location to suit water quality.

Upon completion of the above calibration cycle the microcomputer 24 through its LCD 16 confirms that stable cavitation is in effect. Thereafter, the calibrated ultrasound wave configuration is transmitted continuously while the 15-minute "patient" cleaning, wound debridement or wound healing therapy is in progress.

In an example of a wave configuration arrived at via the above-described iterative calibration technique, the duty factor is 0.4, with full-wave rectification, the applied frequency is 60 kHz, and the pulse repetition period (PRP) is 15 seconds. Then the number of alternate compressional and rarefaction cycles is (15×60,000×0.4)/2 or 180,000. For a duty factor of 0.6, the number of alternate compressional and rarefaction cycles is 270,000. The number of follow-on compressional half-cycles is 15×60,000×0.6 or 540,000 and, for a duty factor of 0.6, the number of alternate compressional and rarefaction cycles is 360,000.

After the 15-minute therapy period is completed, or transient cavitation is detected, the microcomputer 24 shuts down the ultrasound for a time period sufficient for cavitation to dissipate, whereafter therapy can be resumed for another 15-minute time period, and so on.

This calibration cycle is more likely a one-time event necessary upon device site installation because water quality varies widely depending on geographical location.

The final waveform resulting from this calibration at a particular location is placed into the memory of microcomputer 24 and is applied for all subsequent device activations at this particular site location.

The presence or absence of inertial or transient cavitation is determined by a signal from a PZT probe X1 (FIG. 1) situated in close proximity to a transducer T1 and in combination with an appropriately configured detection circuit 30. PZT probe X1 generates a signal fed to microcomputer 24, which manages all associated signals, system components and processes.

Operator control over microcomputer 24 is provided by a control unit 10 including LCD component 16, which are situated on or near wound treatment therapy tank 26.

Microcomputer 24 induces the energization of transducer T1 with a full-wave ultrasonic waveform alternating with a rectified alternating waveform, defined by parameters selected during the calibration process as discussed above. This ultrasound generation method suppresses inertial and transient cavitation. The system generates bubbles at the applied frequency and compresses the bubbles so that they are smaller than their resonant size at the applied frequency, thereby prolonging stable cavitation.

Because vibrating bubble-to-bubble interaction causes bubbles to assume a non-spherical shape, their vibratory response is non-sinusoidal and therefore contains harmonics and sub-harmonics of the applied frequency. A limitation of the above-discussed prior-art human patient cleaning device was the 30 kHz applied frequency because its third sub-harmonic 10 kHz, proved detectable by all immersed human patients through conduction of the 10 kHz subharmonic by their bony prominences to their inner-ear, some patients finding the noise either irritating or intolerable. For the prior human patient cleaning device, lowering the applied intensity served to decrease the amplitude of the third sub-harmonic which lowered the noise to an acceptable level in most but not all cases. This necessary lowering of intensity proved to be at the expense of cleaning process effectiveness for the patient.

The present apparatus has removed this limitation by increasing the applied frequency to 60 kHz for human and animal exposure and therefore its third sub-harmionic to 20 kHz, which is above the threshold of human hearing. The detection circuit 30 may also employ harmonics for detection of stable cavitation.

For fish treatment, the applied ultrasonic frequency is lowered to 30-kHz, because the frequency detection capability of farm-raised fish is, at the highest, in the low hundreds of Hz.

The present apparatus provides four levels of intensity, one for decontamination at more than 5 W/cm² SPTP, the second for cleaning and open-wound debridement at 3 W/cm2 SPTP (maximum), the third for wound healing at 1.5 W/cm2 SPTP (maximum), and the fourth for fish conditioning at 0.5 W/cm2 SPTP.

The 30 or 60 kHz applied frequency is swept up to +/−5 kHz at 120 Hz to provide the likelihood of increased microorganism kill.

The limitation exhibited by 1-mHz- and -above hand-held therapy device is its inability at 0.1-0.5 W/cm2 intensity to stimulate any form of cavitation in the water thus enabling ultrasonic pressure waves to penetrate a human patient's body without attenuation, thereby exposing nucleation sites within the patient to cell damage and free radicals from inertial or transient cavitation. This limitation of these hand-held devices can only be removed by lowering their applied frequency and increasing the acoustic intensity of the devices. There's no better example than the 1 mHz hand-held therapy device for demonstrating that water's reaction to ultrasonic pressure waves may have unanticipated major harmful effects on the desired therapeutic clinical result and that reliance on first-order, open-ended controls to effect stable cavitation may only serve to increase the risk of cell damage due to the non-visible presence of inertial or transient cavitation within the human patient's body.

An advantageous element of the present apparatus is an ability to differentiate between occurrences of stable and inertial or transient cavitation within contained tap water within a wound-therapy tank 26. An inertial or transient cavitation detection signal always overrides the stable cavitation detection signal so that microcomputer 24 can suppress or maintain inertial or transient cavitation depending on the required mode of operation. The location of PZT probe X1 of detector circuit 30 is in-line with a face 32 of transducer T1 at the highest intensity within the wound-therapy tank 26. In response to a signal from PZT probe X1, microcomputer 24 displays on LCD 16 the cavitation status within the water contained within the wound-therapy tank 26 at all times during operation.

PZT probe X1 and detection circuitry 30, inter alia, overcome the limitation of prior human patient cleaning devices in their inability to detect inertial or transient cavitation and to thereby maintain stable cavitation suitable for wound-therapy.

Decontamination

The need is recognized for disinfection of a tank 26 used for ultrasound wound treatment. After completion of a wound-therapy procedure in therapy tank 26, the tank must be decontaminated from pathogens shed by the patient or subject. A number of microorganisms have been found to withstand hot-water temperatures and chemical disinfectants, which suggests that chemical means alone are not 100% effective. Also, experimental data suggests that ultrasound in the low-kilohertz frequency range is capable to some measure of inactivating certain human disease agents that may reside in water. This experimental ultrasound data states that the human pathogens tested were selected on their normal routes of infection, for example, skin or intestinal tract, or their structural similarities to such agents, which would make them likely candidates of whirlpool or hot tubs.

In an experiment, ultrasound killed within 1 hour a variable percentage of the following microorganisms: bacteria (*Pseudomonas aeruginosa, Bacillus subtilis Escherichia coli*), fungus (*Trichophyton mentagrophytes*) and viruses (feline herpes virus type 1; this sub-family also includes the human herpes viruses, herpes simplex virus types 1 and 2). This experiment concluded that 100% microorganism killing was a dose-effect dependent on time of exposure and level of ultrasound intensity but the mechanism of microorganism "kill" appeared to be inertial or transient cavitation.

This microorganism "kill" principle appeared to be the high forces and high temperatures associated with inertial or transient implosions which can disintegrate cell walls and membranes of bacteria and certain enveloped virus but only in the immediate vicinity of these micro-sized implosions. Because an apparent defense mechanism of pathogens is to gather at the antinodes of a constant frequency ultrasonic wave where the amplitude of the ultrasound pressure wave is at a minimum, the present apparatus employs a rapid frequency-sweep modality which serves to oscillate the location of the antinodes in space thereby exposing the microorganisms to an increased number of cavitation implosion events.

Experimental data reveals that ultrasonic cavitation enhances the effect of different antibiotics and disinfectants. Clearly, disinfectant plays no part in the deactivating of pathogens exposed to the high forces and temperatures created by cavitation implosion events. Reasons for the synergism of water, ultrasound and disinfectant having an apparently enhancing germicidal effect over water and disinfectant alone are largely unknown. Since experiments have demonstrated acoustic pressure waves used in conjunction with disinfectant does exhibit an increased germicidal effect, the synergism hypothesis is that like vibrating bubbles the pathogens are subjected to alternating compression and rarefaction ultrasonic pressure waves. Since the pathogen's internal contents are normally equalized in pressure corresponding to ambient pressure, in the presence of a rarefaction pressure wave an enveloped pathogen expands in size from internal pressure because of the absence of balancing external pressure. On the following ultrasonic compressional pressure wave the enveloped pathogen is squeezed to a size smaller than normal, further increasing the pressure on the inner contents. The oscillatory stress pattern on a pathogen's envelope could be repeated up to 30,000 to 60,000 times each second. It is hypothesized that these many positive to negative stress inversions may cause cell-wall fatigue which in turn creates fissures or even fractures in a cell-wall or membrane which open upon rarefaction pressure cycles, thereby exposing the microorganism's inner contents and then close shut on the compression pressure cycle.

It is also hypothesized that if the medium surrounding the pathogen was water these stress inversions on the pathogen might be survivable for longer time-periods, but when the medium is disinfectant, as the fissures or fractures open on the rarefaction pressure cycle exposing the pathogen's inner contents to disinfectant, the following compressional pressure cycle forces the disinfectant into the cell's interior, thereby killing the cell.

The present apparatus exhibits a decontamination cycle employing a combination of water, ultrasonic pressure waves, and disinfectant in order to secure disinfection within a shorter time period than is possible with ultrasound and water alone or disinfectant alone, with the goal of taking less time to effect disinfection than current hospital procedures, which range typically from 12-30-minutes. The required disinfectant should exhibit a surface tension approaching that of water (72 dyne/cm) and a viscosity approaching that of water (0.01 poise) and exhibit germicidal action against the microorganisms listed above and those microorganisms appropriate to animals, and be non-flammable.

In fish farming applications, there is a difficulty with containing disinfectant in the ultrasonic therapy tank. Therefore disinfectant is not used to kill fish microorganisms. Instead, the necessary full ultrasonic dose effect (time and ultrasonic intensity) applicable to transient cavitation 100% microorganism kill is used.

In order to increase the spectrum of microorganism kill, it is intended that all patient germicidal cycles employ the wound therapy pulsed waveform with its duty factor set to low values (less than 0.4), sufficient to induce transient cavitation and the collapsing of very small bubbles.

Because decontamination is accomplished by the use of transient cavitation and not stable cavitation, the apparatus includes a number of patient precautionary or protection measures. The decontamination cycle is under microcomputer control, which dictates the following operational sequence.

By means of touchpads 12, 18, 22, etc., therapy tank 26 is automatically filled to preset levels and also emptied automatically (except in the case of fish). Ultrasonic decontamination cannot be accessed until wound treatment has been conducted and operator confirmation of patient or subject removal from the therapy tank 26. Microcomputer 24 determines readiness for wound treatment by noting that the wound treatment preset tank fill level and automatic water shut off is completed. After termination of the preset 15-minute wound treatment time, microcomputer 24 informs the operator via LCD 16 that therapy tank decontamination can take place and provides the necessary touchpad instructions via the LCD. The instructions include the appropriate decontamination information and an instruction requiring mandatory patient removal from the therapy tank 26 before decontamination can be initiated and requires touchpad confirmation of patient removal to be confirmed to microcomputer memory. After confirmation of patient removal, microcomputer 24 adds a specific volume and dilution of tap water and disinfectant to the therapy tank 26 then activates ultrasonic full-wave, equal-amplitude compressional and rarefaction and half-cycle compressional pressure waves sufficient to cause transient cavitation for the preset decontamination time period after which the microcomputer automatically switches off the ultrasound. For a fish decontamination cycle, disinfectant may not be employed due to the difficulty of containing disinfectant in the ultrasonic therapy tank. During the decontamination time period, audible and visual annunciators including a flashing LCD display are active, signifying an "operator precautionary" condition.

After decontamination is completed, microcomputer 24 automatically drains tank 26 and requests via LCD 16 that the tank be rinsed with tap water and then dried with germ-free cloths or a thermal blow drier. Microcomputer 24 disconnects the system from electrical power after a preset time period.

Microcomputer 24, using its internal precision clock, synchronizes with a 30 or 60 kHz oscillator O1 to time an interval from a closing of switches K1 and K7 and an activating of amplifier A3 to a signaling of an adjustable-gain amplifier A2 by PZT detector X1 that transient or inertial cavitation has taken place, at which time the microcomputer places the resulting time into temporary memory then repeats the process for a total of ten times before calculating the average pulse repetition period. Using the average pulse repetition period, the calibration cycle (or program) next requires microcomputer 24, using its internal precision clock, to synchronize the 30 or 60 kHz oscillator O1 with a full-wave rectifier R1 to form a 0.8 duty factor pulse-train (see FIG. 2A) and then to close switches K1 and K7 which activates amplifier A3 until PZT detector XI signals the adjustable-gain amplifier A2 that transient or inertial cavitation has taken place, at which time the microcomputer compares the elapsed time from the activation of amplifier A3 until to the signaling by amplifier A2 that transient cavitation has occurred for the required time of 15 minutes.

Microcomputer 24 automatically resets the duty factor to a lower value and continues as described above until a duty factor value is attained that results in the required time of 15 minutes. The duty factor may be reset in increments of less than 0.1.

PZT detector X1 feeds both a 10 or 20 kHz acceptor circuit A4 and a 10 or 20 kHz rejector circuit R2 which feed an adjustable gain narrow-band sub or harmonic amplifier A1 and the adjustable-gain broadband amplifier A2 whose outputs are fed to the microprocessor. Acceptor circuit A4 and rejector circuit R2 may employ harmonics or sub-harmonics.

From the amplifiers A1 and A2 outputs the microprocessor 24 determines the required pulsed waveform needed to arrest inertial or transient cavitation for a minimum time period of 15 minutes (or other suitable time selectable by the operator).

After the required pulsed waveform has been determined, microcomputer 24 places the defining parameters of the determined pulse waveform into an internal memory. Those parameters are used thereafter for all open-wound therapy purposes at the particular installation site.

The operator can empty the therapy tank 26 either by following instructions displayed on LCD 16 or by depressing illuminated "ON" touchpad 12. Either action opens switch K4, thereby de-energizing solenoid S3 to open drain 28. Subsequently depressing the "illuminated" ON touchpad 12 removes all electrical power from the apparatus including touchpad illumination.

Upon completion of the onsite calibration cycle, the apparatus is ready for routine open-wound therapy treatment or, if required, intact tissue "patient" cleaning (see FIG. 2A) for the cleaning and therapy pulsed waveforms.

There are four intensity levels of ultrasonic transmission: (1) decontamination triggered or activated by switch K1, (2) wound debridement/cleaning, triggered or controlled by operation of a switch K2, (3) wound healing, which is triggered or activated by operation of a switch K3, and (3) fish conditioning, which is initiated by operation of a switch K8.

There are three modes of ultrasonic transmission: (1) continuous, which is reserved for the decontamination cycle, (2) pulsed at a duty factor greater than 0.4 for the decontamination cycle, and (3) pulsed for the absence of inertial or transient cavitation which is reserved for the wound debridement, wound healing and fish conditioning cycles.

Microcomputer 24 alternately enables and disables rectifier R1 using either a duty factor of less than 0.4 (enable), or 1.0 (disable) for the decontamination mode, and only enables rectifier R1 for wound debridement, wound healing and fish conditioning (see FIG. 2).

The duty factor (less than 0.4) is determined by microcomputer 24 in a fashion similar to that described above, with the criteria being the lowest duty factor that stimulates continuous transient cavitation due to a majority of compressive pressure waves that collapse very small bubbles.

During a decontamination process preferably used in connection with the treatment of humans and animals but probably not fish, microcomputer 24 holds off amplifier A3 by keeping switch K7 open until it has completed the following actions: (i) the therapy tank is filled to the preset control level detected by sensor D2, (ii) the ambient-air input normally fed through the Venturi for therapy tank filling is replaced by disinfectant by closing switch K5 which energises solenoid S1, and (iii) the microcomputer clock is set to deliver the preset dilution of disinfectant necessary to effect the required sonic germicidal action based on the volume of water contained by therapy tank 26 up to its overflow port and beyond, if necessary (experiment). Microcomputer 24 then closes switch K6, which energizes solenoid S2 so that the velocity of the water supply causes a Venturi I1 to suck in disinfectant until the microcomputer shuts down the water supply and disinfectant by de-energising solenoids S1 and S2. Venturi I1 is an injector posed along a feed pipe 34 proximate to a barrier formed by a wall of the pipe, for instance, at a 90-degree elbow-type bend 36 in the feed pipe. Venturi injector I1 is operatively connected to solenoid valve S1 on an upstream side for introducing air into a water stream flowing along feed pipe 34. Venturi injector I1 is alternately coupled to a disinfectant reservoir 38 via solenoid valve S1, whereby the injector introduces a disinfectant into a water stream flowing along feed pipe 34.

Microcomputer 24 then delivers 30 or 60 kHz ultrasound at an intensity in excess of 5 W/cm2 SPTP for the pre-set decontamination time period as monitored and controlled by the microcomputer clock. Upon completion of the decontamination cycle, and in the auto mode, the microcomputer opens the drain 28 by opening switch K4 which de-energizes solenoid S3. Microcomputer 24 then follows its shut down procedures prior to disconnecting from electrical power.

The present apparatus as used for treating fish utilizes existing technology for general water-quality maintenance in fish holding tanks 40 and 42 (FIGS. 3 and 4) such as the requisite number of sequential rotating water jets (not shown) situated on a tank's bottom surface 44, 46 necessary to sweep all fish excrement from the tank bottom surfaces into a drain return 78 situated at the lowest point on the tank bottom 44, 46. The fish excrement particulate is then sucked into and is retained by filters (which are removable and cleanable) by means of a bi-directional pump/motor assembly 58 including a motor 100, a pump 102, and pair of filters 104 and 106

Figure 4:
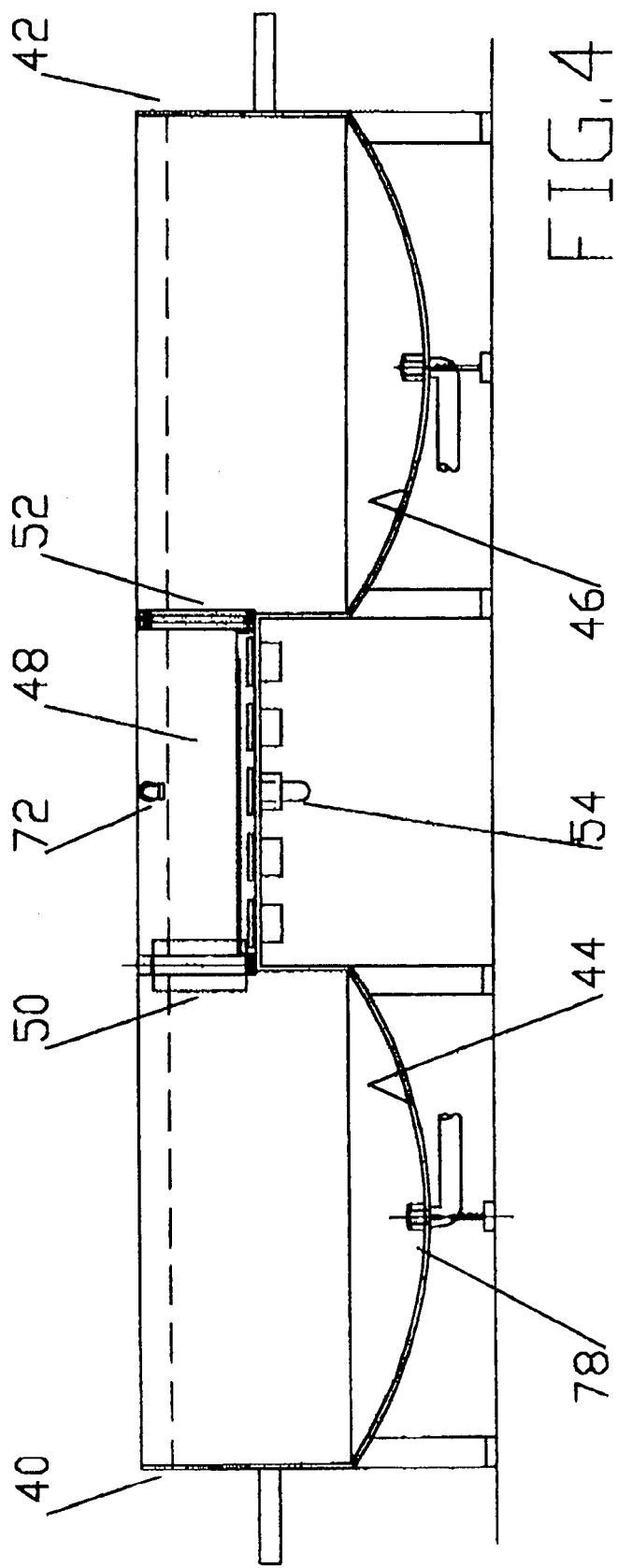
FIG. 4 is an elevational view of the two-tank fish farm with ultrasonic therapy installation shown in FIG. 3.
Figure 5:
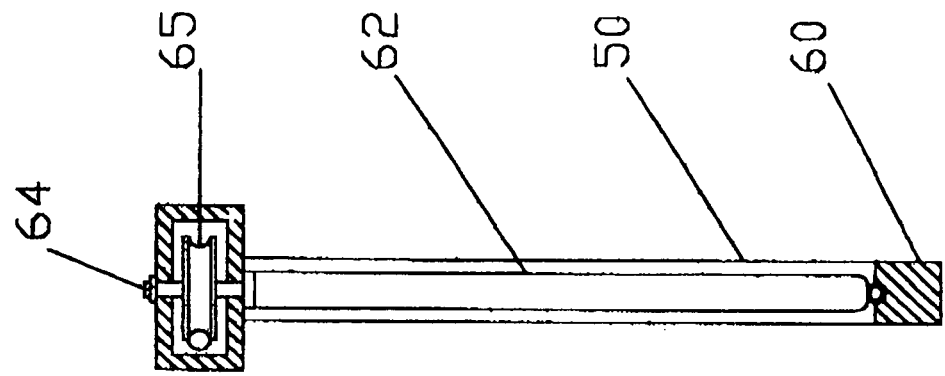
FIG. 5 is a schematic front elevational view of a louvered barrier shown in FIGS. 3 and 5.

Additionally, FIGS. 4 and 5 illustrate several methods for providing results beneficial for fish raised in fish-farming facilities, for example, the water in which the fish swim can be recirculated continuously and irradiated with high intensity ultrasound for decontamination purposes. In this way waterborne fungi, parasites (e.g., lice) and microorganisms can be destroyed through transient or inertial cavitation without the intervention of disinfectants (without a decontamination cycle).

At selected time periods, daily or two or three times weekly, fish farmed in a system having two or more holding tanks 40, 42 can be recirculated from one tank 40, 42 to another 42, 40 and while passing through an ultrasound section or therapy tank 48 can be irradiated with low intensity ultrasound to effect improvement in blood circulation and fat reduction (wound healing cycle). When used in this manner, ultrasound treatment can be viewed as equivalent to preventative medicine because fish reared in holding tanks are denied vigorous normal "outside activity" which helps to keep them healthy.

Figure 3:
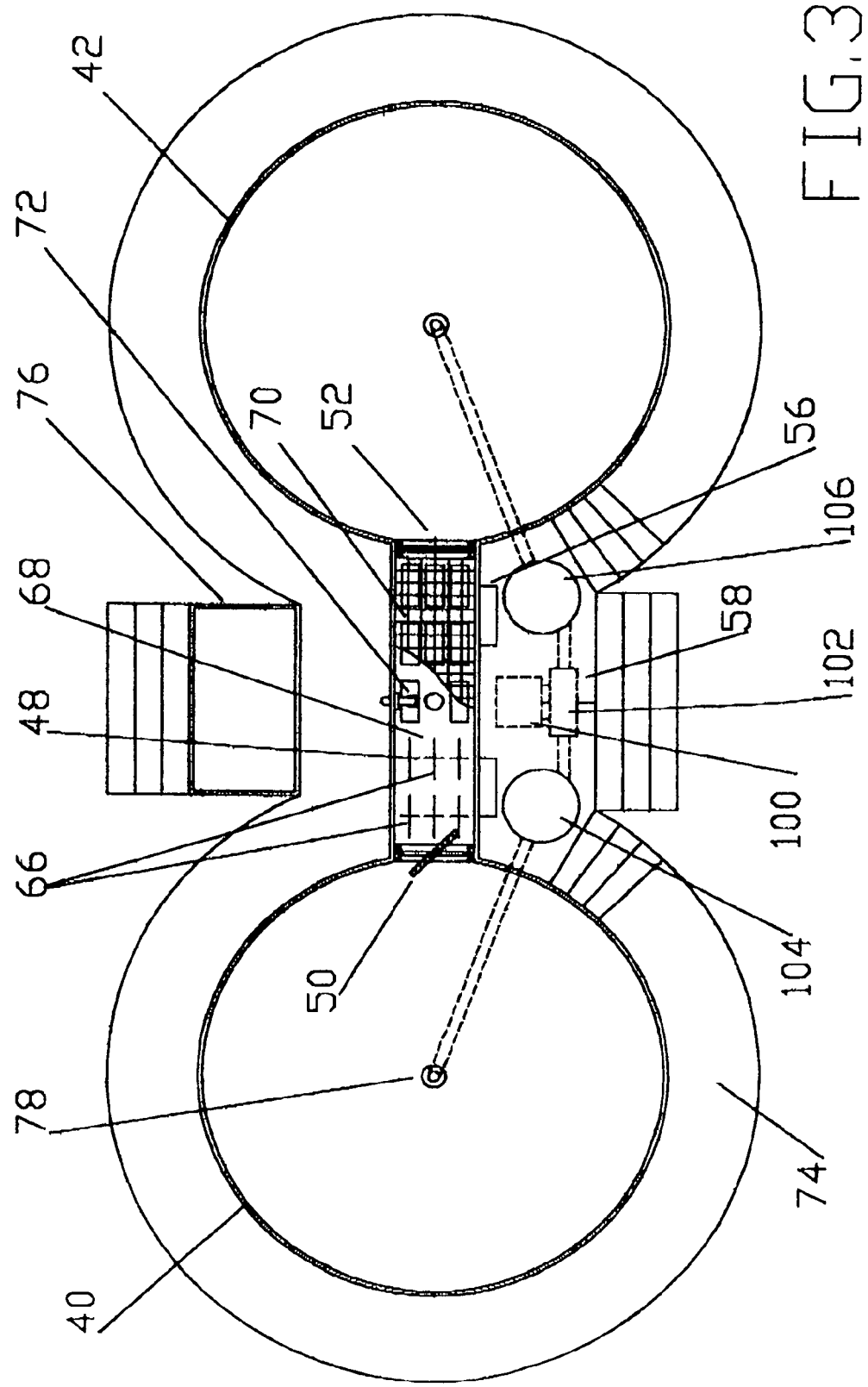
FIG. 3 is a plan view of a two-tank fish farm with an ultrasonic therapy installation.

As depicted in FIG. 3, tank 48 includes a plurality of transducers 66 provided in a bottom surface 68. A tap 72 is provided at an upper end of the tank 48, while a protective mesh or screen 70 may be provided in tank 48 above transducers 66. A walkway 74 is provided about tanks 40, 42, and 48.

Fish in a distressed or contaminated condition can be isolated from healthy fish and treated separately and collectively in the integral ultrasonic therapy tank 48 for removal and destruction of pathogen, fungal and ectoparasitic infection (wound debridement/cleaning cycle). After treatment these fish are isolated by moving them to a separate quarantine tank 76 from which they are periodically ultrasonically treated and not returned until fully cured to the general fish population.

When a two or more holding tank system is in need of maintenance or removal of solid waste excrement from a given tank, then fish can be transferred from one tank 40, 42 to another 42, 40 while this is accomplished. Upon completion, the tank 40, 42 that received maintenance is refilled and the fish transfer accomplished as needed (tank cleaning cycle).

Figure 6:
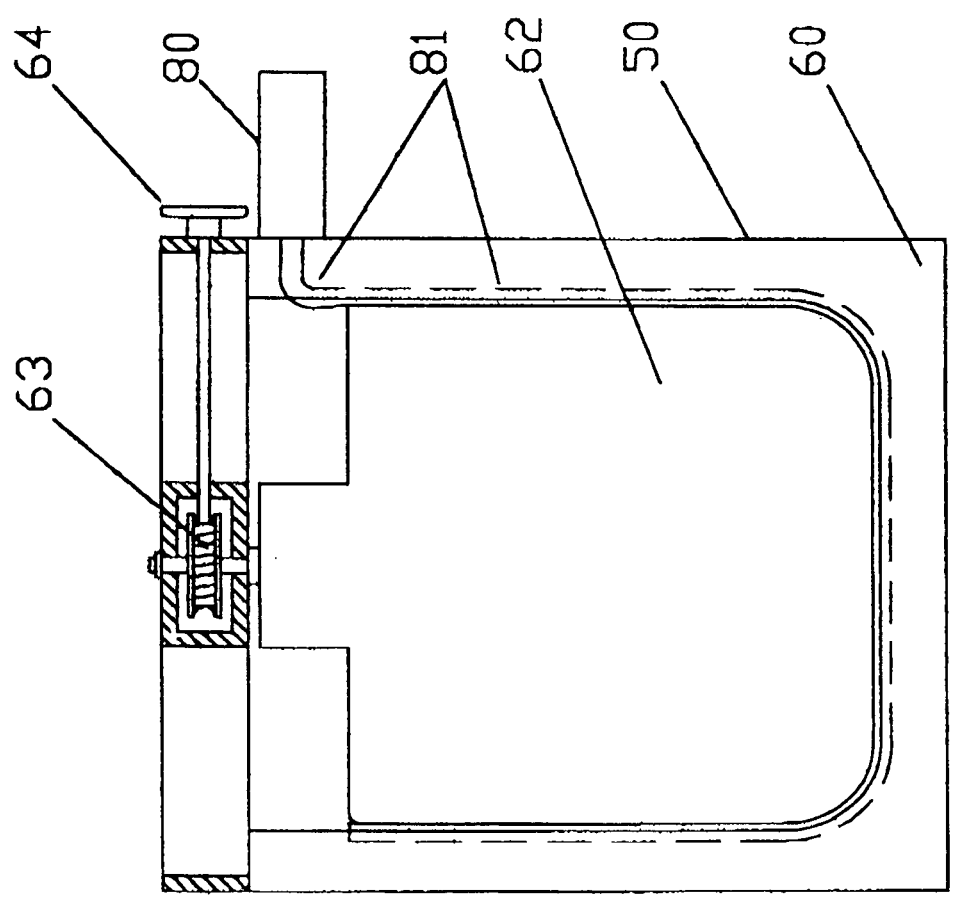
FIG. 6 is a side elevational view of the louvered barrier of FIG. 5.

Louvered barriers 50 and 52 are provided to limit the fish movement between tanks 40, 42 and the ultrasonic therapy tank 48. As depicted in FIGS. 5 and 6, louvered barriers 50 and 52 each include a welded frame 60 and a movable water-sealing louver or door 62 that have a width sufficient to allow free passage of fish. Door 62 is made of a light-weight sound-absorbing material. These louvered barriers 50, 52 can be alternately opened and closed manually via a lever or knob 64 that turns a worm 63 meshing with a wheel 65. Alternatively and preferably, louvered barriers 50, 52 are operated by automatic means controlled by a microcomputer controller 56. The following description assumes microcomputer automatic control.

As required, a bi-directional circulating motor, pump and filter 58 provide a slow-moving water flow from one tank 40, 42 to another 42, 40. In the decontamination cycle, the louvered barriers 50 and 52 are adjusted sufficiently not to interrupt water-flow but closed sufficiently to prevent fish entry before the high-intensity ultrasound can be activated.

The microcomputer 56 through its LCD requires the operator to remove all fish from the ultrasonic therapy tank 48, which the operator must confirm through appropriate keypad entry. High-intensity ultrasound is then activated to generate transient or inertial cavitation. This operational mode can be sustained 24 hours daily, 7 days weekly or until a different operational cycle is selected using the keypad. However, before such action is undertaken, the microcomputer 56 switches off the high-intensity ultrasound.

As required, the bi-directional motor, pump and filter 58 provide a slow-moving water flow from one tank 40, 42 to another 42, 40. With the wound healing cycle selection, the ultrasonic-tank water tap is activated to provide aerated water into the ultrasonic tank area and remains activated until the fish "conditioning cycle" is completed. When sufficient aeration has been provided, the low-intensity ultrasound is activated and the louvered barriers 50 and 52 are opened fully to permit free fish entry and exit from one tank 40, 42 to another 42, 40. Manual participation of the operator is required to move all fish from one tank to another to ensure that all fish are sonicated.

This fish condition cycle is completed by the operator depressing the stop cycle touchpad. This shuts down the generation of ultrasonic pressure waves in therapy tank 48. The microcomputer 56 through its LCD asks the operator whether all the fish have been removed from the ultrasonic therapy tank, which the operator confirms through appropriate keypad entry. The microcomputer 56 then adjusts louvered barriers 50 and 52 sufficiently not to interrupt water flow but closed sufficiently to prevent fish entry. An adjustable automatic timer (part of the microcomputer 56) is provided to automatically shut down this cycle in the event of operator absence.

As required, the bi-directional motor, pump and filter 58 must be switched off and the louvered barriers 50 and 52 tightly closed by a pneumatic pump 80 that inflates a tubular sealing member 81. The operator depresses the microcomputer stop cycle touchpad to accomplish this. The LCD will ask the operator "what's next." The operator uses the sequencer touchpad 22 (FIG. 1) to select and then start the wound debridement/cleaning cycle. This cycle is almost identical to that used for humans, except that the microcomputer 56 simultaneously fills and drains the ultrasonic therapy tank 48 until the necessary aerated water exchange is effectuated after which a drain 54 is closed and the ultrasonics switched on. The distressed or contaminated fish are placed in the therapy tank 48 for the automatically prescribed treatment time period. Thereafter the microcomputer LCD instructs the operator to remove the fish to quarantine tank 76 and requires confirmation from the operator. This treatment cycle is to be repeated periodically every few days until the fish(es) in question is judged healed and free from infection.

Following the current fish decontamination cycle, the operator uses the touchpad to initiate a high ultrasound intensity decontamination cycle in therapy tank 48, after which the microcomputer 56 switches off the ultrasound and drains the tank. After tank draining, the microcomputer asks the operator if the debridement/cleaning cycle is to be repeated. If the answer is in the affirmative, the microcomputer 56 refills the tank, etc., and proceeds as before. If not, the microcomputer 56 adjusts louvered barriers 50 and 52 sufficiently not to interrupt water flow but closed sufficiently to prevent fish entry. In debridement/cleaning cycle, it is to be noted that with every therapy tank emptying the opening of louvered barriers 50 and 52 will lower the water level in the fish holding tanks 40 and 42. This level depletion will be automatically made up by automatic water level sensing floats (not shown).

At the next operator cycle selection, other than debridement/cleaning cycle, the microcomputer 56 will switch the water circulating motor, pump and filter 58 back on.

In the event that solid excrement waste from the fish tank needs to be removed from a holding tank, the following procedure is performed. The operator, using the touchpad sequencer, selects "excrement removal, Tank B" (referring to tank 42), for example, and starts the process. The microcomputer 56 fully opens louvered barriers 50 and 52 to allow free passage of the fish and subsequently reverses the flow of the recirculating pump to assist in fish transfer from tank 42 to tank 40. After all the fish have been transferred then the operator, using the touchpad, alerts the microcomputer 56 which then fully closes barrier 50 while barrier 52 is left open and the circulating pump is again reversed which empties tank 42 to "drain" after which the circulating pump is switched off.

After excrement removal, tank 42 is refilled, barrier 50 is opened and the microcomputer 56 switches the circulating pump back on, allowing the fish to return with assistance from tank 40 to tank 42, for example.

As part of the water high intensity ultrasound decontamination cycle the microcomputer 56 automatically reverses the water flow commensurate with time necessary to drain the holding tank in question.

Fish Killing and Tissue Sanitization Apparatus

The following operational description is of a stand-alone ultrasonic fish slaughtering and tissue sanitization apparatus applicable to all fish species that experience accelerated mortification when subjected to subaqueous ultrasonic pressure waves having frequencies in the range 20-60 kHz and peak amplitude acoustic pressure waves in the range 75 Pa-300 kPa. The apparatus may be used with a dedicated tank 26' shown in FIG. 9 or in conjunction with the wound treatment tank 26 of FIGS. 3 and 4. Although the discussion below is directed mainly to tank 26', it should be understood that the same procedure could be used using tank 26 of FIGS. 3 and 4. In the latter case, the functionality described herein with reference to FIG. 7 may be added to the functions described above with reference to FIG. 1. Thus, the apparatus of FIG. 1 may be modified to incorporate the functionality of the apparatus of FIG. 7.

Figure 7:
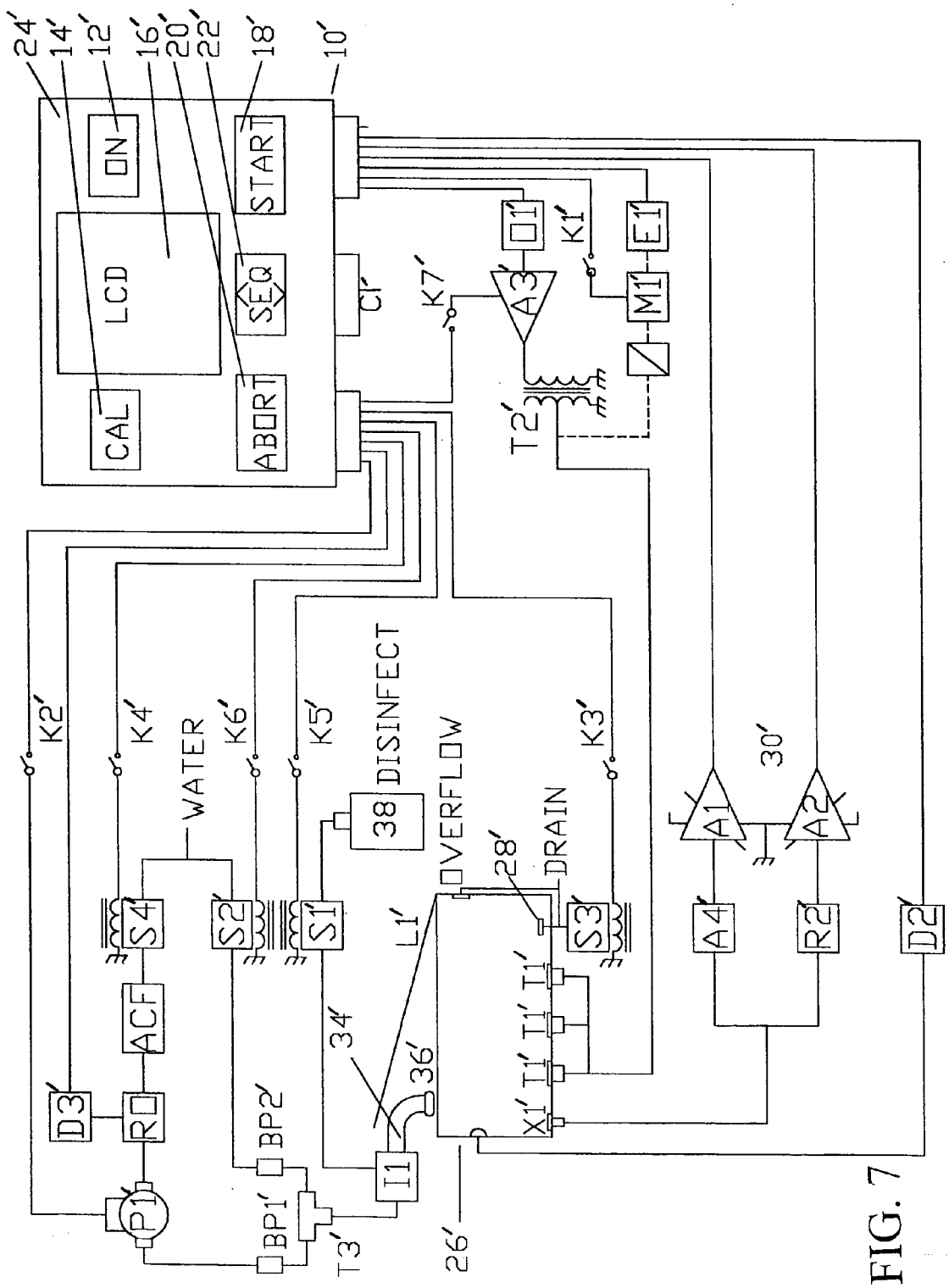
FIG. 7 is an overall system block diagram outlining functional interrelationships of an ultrasonic apparatus for rendering fish instantaneously unconscious and inducing continued insensibility until death supervenes and for concomitantly sanitizing fish tissue, in accordance with the present invention.

FIG. 7 illustrates a control microcomputer 24' by which an operator can initiate, control, modify, and terminate processes for fish slaughtering and tissue sanitization. Microcomputer 24' has a control panel 10' and includes an illuminated "on" touchpad 12' for activating the invention's fish slaughtering and tissue sanitizing apparatus. An illuminated calibration touchpad 14' initiates the factory/onsite calibration cycle for particular fish species slaughter/sanitization calibration.

A liquid crystal display (LCD) 16' displays all relevant information and operator instructions. A further start touchpad 18' is used to initiate a "start selected sequence" routine. An abort touchpad 20' initiates a "stop/abort selected sequence" routine. A sequencer touchpad 22' is accessed by microcomputer 24' to assist the operator to locate the required process.

The fish slaughtering and tissue sanitization apparatus described herein operates in either a manual or in an automatic operational mode. Either mode is selectable by the operator.

Sequencer touchpad 22' runs the LCD 16' through a menu so the operator can identify and initiate selections as required. The menu displayable via LCD 16' is set forth in the normal sequence of processing, that is:

fish slaughtering/sanitization tank fill
fish slaughtering/sanitization calibration—supporting initiating LCD instructions
fish slaughtering/sanitization—supporting initiating LCD instructions
fish slaughtering/sanitization tank empty
tank decontamination, empty/fill
tank decontamination—supporting LCD initiating instructions
tank decontamination, empty.

It is to be noted that the three decontamination cycles are included as one automatic process.

Before the fish slaughtering/sanitization apparatus can be used in the "automatic" mode of operation it must first have been calibrated for the fish species in question. This should be accomplished at an approved factory and/or a properly equipped and approved onsite fish-farm location.

Calibration

In order to effect the calibration process, tank 26' must first be filled with submicron filtered/degassed water. At the end of the calibration cycle, tank 26' must be emptied and refilled with tap water in preparation for the follow-on ultrasonic decontamination cycle.

An imperative for the fish slaughtering/sanitization calibration process is production of an end product exhibiting the highest market quality as characterized by exemplary external and internal appearance of the slaughtered fish, longer shelf life than available by current methods of slaughter and satisfactory taste.

Another imperative is that regardless of species, the fish slaughtering/sanitization calibration process must result in all fish of a given species experiencing rapid unconsciousness and continuing insensibility until death supervenes.

Prior to conducting the following ultrasonic calibration process, the calibrator must be instructed to employ the lowest peak pressure amplitude and the longest possible exposure time that result in accomplishment of the aforementioned marketing and environmental imperatives.

The rapidity of fish unconsciousness is proportional to the maximum applied peak pressure amplitude while the effectiveness of tissue sanitization is proportional to the length of the exposure time. However, the end values for both criteria should not deviate from the above marketing and environmental imperatives. Fish "harvest" weight for all species is a second order effect and should be kept consistent from batch to batch.

In preparation for slaughter/sanitization calibration by fish species, the apparatus is activated by depressing the ON/OFF touchpad 12' which accesses the microcomputer 24', which by means of LCD 16' assists the calibrator to locate and subsequently complete the required operations.

The calibrator, using the sequencer touchpad 22', runs the LCD 16', through the menu until reaching the heading "Fish Slaughtering/Sanitization" then through a listing of all fish species for which the apparatus has already been factory calibrated. For each of the listed species, relevant "codes" for the lowest peak pressure amplitude and longest exposure time to effect slaughter/sanitization in the approved manner are displayed by LCD 16'.

In the absence of a desired species' slaughtering/sanitization information, the apparatus is calibrated as follows. The calibrator depresses the calibration touchpad 14', which accesses and displays the "codes" for associated peak pressure amplitudes in the range 75 Pa-300 kPa and then, by means of the sequencer touchpad 22', scrolls up or down the "codes" to locate and select a trial peak pressure amplitude and associated trial time of exposure. Both the peak pressure and exposure time codes will "flash" upon reaching the LCD display 16'.

To lock in the "flashing" trial peak pressure amplitude selected, the calibrator depresses the start touchpad 18', which causes the stepper motor M1' to drive the auto transformer T2' voltage selector to the encoder E1' position which corresponds to the calibrator's peak pressure amplitude selection.

To lock-in the "flashing" associated trial time of exposure selected, the calibrator depresses the start touch pad 18' for a second time which causes microcomputer 24' to correlate the two trial requirements.

After correlation has been completed, microcomputer 24', by means of LCD 16', will instruct the calibrator to depress the start touchpad 18' for a third time in order to initiate the trial slaughtering/sanitization process.

Following an unsuccessful trial slaughtering/sanitization calibration, the calibrator can, by depressing the abort touchpad 20', abort, (delete) all data-entries associated with an unsuccessful trial.

However, upon successful completion of a repeated trial, microcomputer 24' by means of LCD 16' instructs the calibrator to depress the calibration touchpad 14' to enter the selected trial peak pressure amplitude and associated trial time of exposure data into microcomputer 24' for which entry it assigns a "code" then places it into the memory (not separately shown) of microcomputer 24' to end the calibration process.

Thereafter the calibrator must keep either a separate fish species identification "Code" listing for such field trial slaughtering/sanitization calibration processes or arrange for field or factory reprogramming of microcomputer 24' by means of appropriate programming apparatus (not shown) utilizing the programming input connector C1' located on control unit 10'.

The final selected peak pressure amplitude and associated time of exposure data, entries from the above trial calibrations for a previously un-calibrated fish species, as implied, are placed into the memory of microcomputer 24' and are applied for all subsequent device activations at the appropriate "Fish Slaughtering/Sanitization" data-entry site location.

The slaughtering/sanitization calibration process must be carried out using commercially available laboratory quality filtered and degassed water or, water from a municipal supply after its treatment for ozone removal followed by submicron reverse osmosis filtering and degassing techniques equivalent to or superior to those employed by this invention, as illustrated by FIG. 7.

The presence or absence of inertial or transient cavitation in tank 26' will be detected by a signal from a PZT probe X1' situated in close proximity to a transducer T1' and in combination with an appropriately configured detection circuit 30'. PZT probe X1' generates a signal fed to microcomputer 24', which manages all associated signals, system components and processes.

Operator control over microcomputer 24' is provided by a control unit 10' including LCD 16' that is situated on or near the slaughtering/sanitization tank 26'.

Microcomputer 24' induces energization of transducer T1' with a full-wave subaqueous 30 kHz ultrasonic waveform. The utilization of submicron filtered and degassed water with this ultrasound generation method serves to suppress inertial and transient cavitation permitting virtually the full amplitude of the compressional and rarefaction pressure waves propagated by transducer T1' to travel the full volume of the slaughtering tank 26' with minimal attenuation which causes the fish-body's interior tissue to experience the required transient bubble imploding cavitation events.

Fish will avoid and try to escape from unfamiliar acoustic noise in their vicinity. Because the frequency detection capability of most farm-raised fish is in the low hundreds of cycles of vibration, the chosen "slaughtering/sanitization" frequency of 30 kHz is undetectable by such fish, which serves to overcome their escape reflex.

With previously calibrated fish species, the present apparatus provides operator selectable ultrasonic slaughtering peak pressure amplitudes and associated times of ultrasonic exposure applicable to the fish species slated to undergo the slaughter/sanitization process.

For selection of existing fish species controls, the operator first depresses the On/Off touchpad 12', to activate the control unit 10' and microprocessor 24', then, by depressing the sequencer touchpad 22' the operator runs the LCD 16' through the menu until reaching the headline "Fish Slaughtering/Sanitization" and then down to the fish species required whose data, when in the LCD display 16', will start "flashing".

To effect automatic fish slaughtering/sanitization the operator first closes the transparent, vented tank lid L1', then depresses the start touchpad 18' causing microcomputer 24', by means of LCD 16', to advise the operator when the automatic fish laughtering/sanitization process is finished. The operator then raises transparent tank lid L1' and removes the slaughtered fish for completion of other activities such as fish inspection, packing and shipping.

During the slaughtering process the 30 kHz applied frequency is swept +/−5 kHz to increase water-borne microorganism infestation kill.

An advantageous element of the present fish killing and sanitization apparatus is its ability to detect transient and inertial cavitation occurring within the filtered/degassed water in tank 26'. A transient or inertial cavitation detection signal from the PZT detector X1' brings the fish slaughtering/sanitization process to a halt until the water contained by tank 26', has been drained then refilled with fresh submicron filtered degassed water.

LCD 16' displays the cavitation status within the water contained within the tank 26' at all times during the slaughtering/sanitization processing cycle.

PZT probe X1' and detection circuitry 30', inter alia, overcomes the limitation of current ultrasonic irradiation tanks because of its ability to detect inertial or transient cavitation which phenomenon is counter-productive to the effectiveness of the invention's fish slaughtering and sanitization process.

Decontamination

The need is recognized for disinfection of tank 26' following fish slaughtering. After completion of the slaughtering process and removal of fish from tank 26', tank 26' must be decontaminated from pathogens shed by the fish. A number of microorganisms have been found to withstand hot-water temperatures and chemical disinfectants, which suggests that chemical means alone are not 100% effective. Also, experimental data has shown that ultrasound in the low kilohertz range is capable, to some measure, of inactivating certain pathogens that may reside in water.

For the tank decontamination cycle, unfiltered municipal water is substituted for filtered/degassed and or reverse osmosis processed water in order to promote the formation of both ultrasonic transient and inertial cavitation which is a necessary part of the decontamination process used for inactivating and killing shed pathogens and parasites.

The ultrasonic decontamination microorganism "kill" principle depends on the high forces and high temperatures associated with inertial or transient implosions which can disintegrate microorganism cell walls and membranes of bacteria and certain enveloped virus but only in the immediate vicinity of these micro-sized implosions. Because an apparent defense mechanism of pathogens is to gather at the antinodes of a constant frequency ultrasonic wave where the amplitude of the ultrasonic pressure wave is at a minimum, the present apparatus employs a rapid frequency-sweep modality which serves to oscillate the location of the antinodes in space thereby exposing the microorganisms to an increased number of cavitation implosion events.

Experimental data has revealed that ultrasonic cavitation enhances the effect of different antibiotics and disinfectants. Clearly, disinfectant plays no part in the deactivating of pathogens exposed to the high forces and temperatures created by cavitation implosion events. Reasons for the synergism of water, ultrasound and disinfectant are largely unknown.

The present fish killing and sanitization apparatus exhibits a decontamination cycle employing a combination of water, ultrasonic pressure waves, and disinfectant in order to secure disinfection within a shorter time period than is possible with ultrasound and water alone or disinfectant alone, with the goal of taking less time to effect disinfection than current procedures, which range typically from 12-30 minutes. The required disinfectant should exhibit a surface tension approaching that of water (72 dyne/cm) and a viscosity approaching that of water (0.01 poise) and exhibit germicidal action against microorganisms appropriate to fish-farming.

The decontamination cycle is under the control of microcomputer 24' by means of LCD 16' and touchpads 12', 18', 20', 22'. Operator intervention, requested via microcomputer 24', dictates the automatic filling of tank 26' to a preset level and then its emptying.

Tank Filling for Fish Killing and Tissue Sanization

To fill tank 26' for fish slaughtering and sanitization, the operator depresses the On/Off touchpad which electrically activates microcomputer 24', then depresses the sequencer touchpad 22' and by its use scrolls LCD 16' up or down until the headline "Fish Slaughtering/Sanitization Tank Fill" is flashing in the LCD display 16'. To commence automatic filling of tank 26', the operator depresses the start touchpad 18' which causes microcomputer 24' to initiate the following actions.

Microcomputer 24' closes relay contact K3 which energizes solenoid S3' closing the drain in readiness for tank 26' filling. Microcomputer 24' then closes relay contact K4', energizing solenoid S4' to open the flow of water from the municipal water supply. The municipal water supply flows through the activated carbon filter (ACF), removing the chlorine content from the water before routing the water to and through the submicron reverse osmosis filter RO.

When the level of water in the RO reservoir (not shown) reaches the preset level detected by sensor D3', microcomputer 24' closes relay contact K2', energizing pump P1' to direct the water flow through backflow preventer BP1' into tee connection T3' and injector I1' (or equivalent) posed along a feed pipe 34' proximate to a barrier formed by a wall of the pipe, for instance, at a 90-degree elbow-type bend 36' in the water feed pipe.

The drop in water pressure that occurs on the exit side of injector I1' accelerates the water flow and creates microsized gas-bubbles that burst upon reaching the barrier formed by a wall of the pipe, for instance, at a 90-degree elbow-bend 36' in the water feed pipe, where from the occluded gas is released to atmosphere.

The resulting flow into tank 26' is water from which all particles above submicron size and occluded gases have been removed. Tank 26' continues filling until reaching the preset control level detected by sensor D2' whereupon microcomputer 24' de-energizes relay K2' causing the pump P1' to shut down terminating the submicron filtered and degassed water flow.

Fish Slaughtering/Sanitization

This description assumes the operator has filled tank 26' with submicron filtered and degassed water, as discussed above, and, in accordance with microcomputer 24' instructions communicated by means of LCD 16', has loaded tank 26' with the prerequisite number of fish while observing the precaution (communicated via LCD 16') not to mix fish species unless they have very similar peak pressure amplitudes and times of exposure before closing the transparent vented lid L1'.

The operator then uses sequencer touchpad 22' to scroll LCD 16' up or down until reaching the headline "Fish Slaughtering/Sanitization" and then to the code and data for the fish species selected for slaughter. In the case of mixed fish species the operator must have first verified that close correspondence of peak pressure amplitudes and exposure times exists. In case of significant mismatch one or another of the species must be removed from tank 26' before slaughter is initiated.

The operator then depresses start touchpad 18' which initiates the automatic slaughtering/sanitizing process as follows. Microcomputer 24' closes relay K1' causing stepper motor M1' to drive the voltage of autotransformer T2' to the required position of encoder E2' then closes relay contact K7' which, by means of oscillator O1' and amplifier A3', drives the transducer T1' for the programmed exposure time whereafter relay contacts K1' and K7' open to complete the process.

Microcomputer 24', by means of LCD 16', indicates that slaughtering/sanitization process is complete and instructs the operator to raise the transparent lid L1' and remove the slaughtered fish for inspection and additional processing as required.

The action of raising and storing the transparent lid L1' causes microcomputer 24', by means of LCD 16', to instruct the operator to initiate the decontamination process, as follows.

Fish Slaughtering/Sanitization Tank Empty

Tank 26' should be emptied following completion of a fish slaughtering/sanitization process or when the PZT detector X1' detects the presence of water transient cavitation, whereupon microcomputer 24' opens relay contact K7', thereby ceasing the propagation of ultrasonic irradiation, and by means of LCD 16' instructs the operator to remove all remaining fish then empty tank 26'.

PZT detector X1' feeds a 10 kHz acceptor circuit A4 and a 10 kHz rejector circuit R2' which feed an adjustable gain narrow-band sub or harmonic amplifier A1' and the adjustable-gain broadband amplifier A2' whose outputs are fed to microcomputer 24'. Acceptor circuit A4' and rejector circuit R2' may employ harmonics or sub-harmonics. From amplifiers A1' and A2' outputs microcomputer 24' determines the presence or absence of transient cavitation.

To initiate automatic tank 26' emptying the operator uses the sequencer touchpad 22' to scroll LCD 16' up or down until the headline "Fish Slaughtering/Sanitization Tank Empty" is flashing in the LCD display 16'.

To commence automatic emptying or tank 26' the operator depresses the start touchpad 18', causing microcomputer 24' to initiate the following actions.

Microcomputer 24' opens relay contact K3' de-energising solenoid S3', thereby opening the drain in readiness for emptying tank 26'. After a preset time, sufficient for tank 26' to be emptied, microcomputer 24', by means of LCD 16', requires the operator to proceed to the decontamination process.

Tank Decontamination

Tank decontamination consists of three automatic procedures: 1) filling tank 26' with water and a preset volume of disinfectant, 2) ultrasonically agitating the water and disinfectant mixture for a preset time period, and 3) emptying tank 26'.

During the period of decontamination, audible and visual annunciators including a "flashing" LCD 16' display are active signifying an "Operator Precautionary" condition is in progress.

To initiate automatic decontamination of tank 26', the operator selectively depresses the sequencer touchpad 22' to scroll LCD 16' up or down until the headline "Tank Automatic Decontamination" is flashing in the LCD display 16'.

To commence automatic filling of tank 26', the operator depresses the start touchpad 18', causing microcomputer 24' to initiate the following actions.

Relay contact K3' is closed, causing solenoid S3' to activate and close the drain. Microcomputer 24' then closes relay contacts K5' and K6' which activate solenoids S1' and S2'. Solenoid S2' causes the municipal water to flow through backflow preventer BP2' through Venturi injector I1' and 90-degree elbow 34' and faucet 35'. Concomitantly, as the municipal water passes through injector I1', the drop in water pressure created on the exit side of injector I1' sucks out disinfectant 38' from its container in a metered flow which, in combination with the municipal water flow, creates the required dilution for the required germicidal solution.

When the water level in tank 26' reaches level sensor D2', microprocessor 24' opens relay contacts K5' and K6', closing off the supply of municipal water and disinfectant 38'. To commence ultrasonic agitation microcomputer 24' closes relay contact K1' causing the stepper motor M1' to rotate autotransformer T2' until its encoder E1' matches the decontamination code stored in the memory of microcomputer 24 whereafter microcomputer 24' closes relay K7' which causes oscillator O1' and Amplifier A3' to drive ultrasonic transducer T1' for the programmed decontamination time period.

To bring the decontamination process to an end microcomputer 24' opens relay contacts K1' and K7', shutting down ultrasonic transmission from transducer T1' then opens relay contact K3' which deactivates solenoid S3' opening the drain and emptying tank 26'. Microcomputer 24' by means of LCD 16' instructs the operator to depress the start touchpad 18' then manually rinse and dry tank 26'. After completion of rinsing and drying of tank 26', microcomputer 24', by means of LCD 16', requests the operator to depress the abort touchpad 20' whereupon microcomputer 24' places its request for manual rinsing and drying into its long-term memory.

After a preset time period microcomputer 24' shuts down all electric power ending the automatic decontamination process.

Tank 26' may be incorporated into the wound treatment apparatus of FIGS. 1-6 as tank 48 (FIG. 3). The function of transducers T1' (FIG. 9) may be performed by transducers 66 provided in bottom surface 68 of tank 48. Injector 11', elbow 34' and faucet 36' are provided at an upper end of tank 48. Two fixed side panels 25' and 27' (FIG. 9) of tank 26' (in the stand alone version of the fish killing and tissue sanitization apparatus) are replaced by louvered barriers 50 and 52 which limit fish movement between tanks 40, 42 and the ultrasonic tank 48, as discussed hereinabove with reference to the wound healing apparatus of FIGS. 1-6. Because of residual disinfectant leakage potential between tanks 40, 42 and 48, the tank decontamination process should not include disinfectant. Microcomputer 24 is programmed to include the slaughtering and sanitization functionality discussed above with reference to microcomputer 24' as well as the wound healing functionality discussed above with reference to FIG. 1.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An ultrasonic treatment method comprising:
   feeding to a tank sub-micron filtered and degassed water, in which stable, transient, and inertial cavitation cannot form;
   disposing a living fish in the water; and
   generating ultrasonic pressure wave vibrations in said water of a frequency range and an intensity and duration to kill the living fish and creating transient cavitation within the fish tissues to sanitize the fish tissues.

2. The method defined in claim 1, further comprising automatically monitoring the water in said tank to detect inertial, transient, or stable cavitation.

3. The method defined in claim 1 wherein the generating of ultrasonic pressure wave vibrations includes sweeping a frequency of the ultrasonic pressure wave vibrations.

4. The method defined in claim 1, further comprising monitoring the water in said tank to detect transient, inertial, and stable cavitation occurring within the water in said tank during the generating of said ultrasonic pressure wave vibrations; and terminating the generating of said ultrasonic pressure wave vibrations in response to detecting of cavitation occurring within the water in said tank.

5. The method defined in claim 1, further comprising:
   removing the killed fish from said tank;
   thereafter delivering disinfectant and water to said tank; and
   thereafter inducing ultrasonic transient cavitation in the water and disinfectant in said tank to kill microorganisms in the tank.

6. The method defined in claim 5 wherein the inducing of said ultrasonic transient cavitation includes generating full-wave compression and rarefaction cycles at an ultrasonic frequency in the water and disinfectant in said tank.

* * * * *